(12) United States Patent
Rees

(10) Patent No.: US 9,684,661 B2
(45) Date of Patent: Jun. 20, 2017

(54) METHOD FOR CORRELATING DATA

(71) Applicant: Kim Marie Rees, Portland, OR (US)

(72) Inventor: Kim Marie Rees, Portland, OR (US)

( * ) Notice: Subject to any disclaimer, the term of this patent is extended or adjusted under 35 U.S.C. 154(b) by 357 days.

(21) Appl. No.: 14/523,570

(22) Filed: Oct. 24, 2014

(65) Prior Publication Data

US 2015/0120694 A1   Apr. 30, 2015

Related U.S. Application Data

(60) Provisional application No. 61/895,012, filed on Oct. 24, 2013.

(51) Int. Cl.
*G06F 17/30* (2006.01)

(52) U.S. Cl.
CPC .. *G06F 17/30106* (2013.01); *G06F 17/30864* (2013.01)

(58) Field of Classification Search
CPC .............. G06F 17/30864; G06F 17/30106
USPC ................................ 707/710, 722
See application file for complete search history.

(56) References Cited

U.S. PATENT DOCUMENTS

| | | |
|---|---|---|
| 2007/0044010 A1* | 2/2007 | Sull .......................... 715/500.1 |
| 2011/0153631 A1* | 6/2011 | Kondasani .................... 707/758 |
| 2013/0060805 A1* | 3/2013 | Kondasani .................... 707/769 |

OTHER PUBLICATIONS

Zhifeng Gu et al., Service Data Correlation Modeling and its Application in Data-Driven service Composition, 2010, vol. 3, 279-291.*

* cited by examiner

*Primary Examiner* — Jean B Fleurantin

(57) ABSTRACT

A method for correlating data stored in a database implements a web crawler element and an analyzer element to discover data correlations between a first set of data and a second set of data. The web crawler element searches online for a plurality of electronic files, and inspects said electronic files in order to determine a file type for each of the electronic files. A plurality of accepted files is marked for review; the accepted files being the electronic files having the file type being a data structure. Each of the accepted files is inspected for chronological tags, wherein a plurality of relatable files is stored in a database, each having chronological tags. The first set of data is then selected from the database to determine data correlations with the second set of data; the second set of data being uploaded by a user account or selected from the database.

18 Claims, 8 Drawing Sheets

METHOD FOR CORRELATING DATA

The current application claims a priority to the U.S. Provisional Patent application Ser. No. 61/895,012 filed on Oct. 24, 2013.

FIELD OF THE INVENTION

The present invention relates generally to a system that automatically searches the Internet for data, stores the data, then compares that data against the existing data in a database. The system then finds correlations and inverse correlations in time series data stored in the database.

BACKGROUND OF THE INVENTION

In research and other analytical fields, a key goal for any project is answering a question or explaining a phenomenon. Whether in basic scientific research or for advertising purposes, workers in these fields attempt to discover and explain cause and effect relationships. For example, a biologist might attempt to explain why a certain compound produces a given effect, a social scientist might attempt to explain why suicide rates drop during holidays, and a marketing professional might try to determine why the latest fad is selling well. As part of the scientific method, researches attempt to come up with a hypothesis to explain a phenomenon or observed result. Prior to this, they perform background research in order to construct a well rounded hypothesis. However, since the process of background research can be time intensive, especially for extremely general or wide ranging phenomenon. Trying to find, review, and evaluate a large number of possible explanations is often unrealistic. There exists a need for a way to expedite and improve this background research stage.

The present invention seeks to address this need through correlation. Correlation can be used to show potential relations between data. Though correlation doesn't imply cause and effect, it can help to quickly identify areas for background research. By focusing background research on data that is at least correlated to the observed effect, a researcher can quickly narrow their field of background research. This allows the researcher to spend less time reading up on data that may end up being completely unrelated, and even lets them focus their efforts on data that has been shown to be strongly correlated to the observed effect. Ultimately, by using correlation a researcher can accelerate the background research stage.

It is therefore an object of the present invention to build a database of files through the use of a web crawler. It is a further object of the present invention to analyze the database to find correlations between stored data files. It is a further object still of the present invention to allow an entity to search for the database for correlated data.

DETAIL DESCRIPTIONS OF THE INVENTION

All illustrations of the drawings are for the purpose of describing selected versions of the present invention and are not intended to limit the scope of the present invention.

Figure 7:
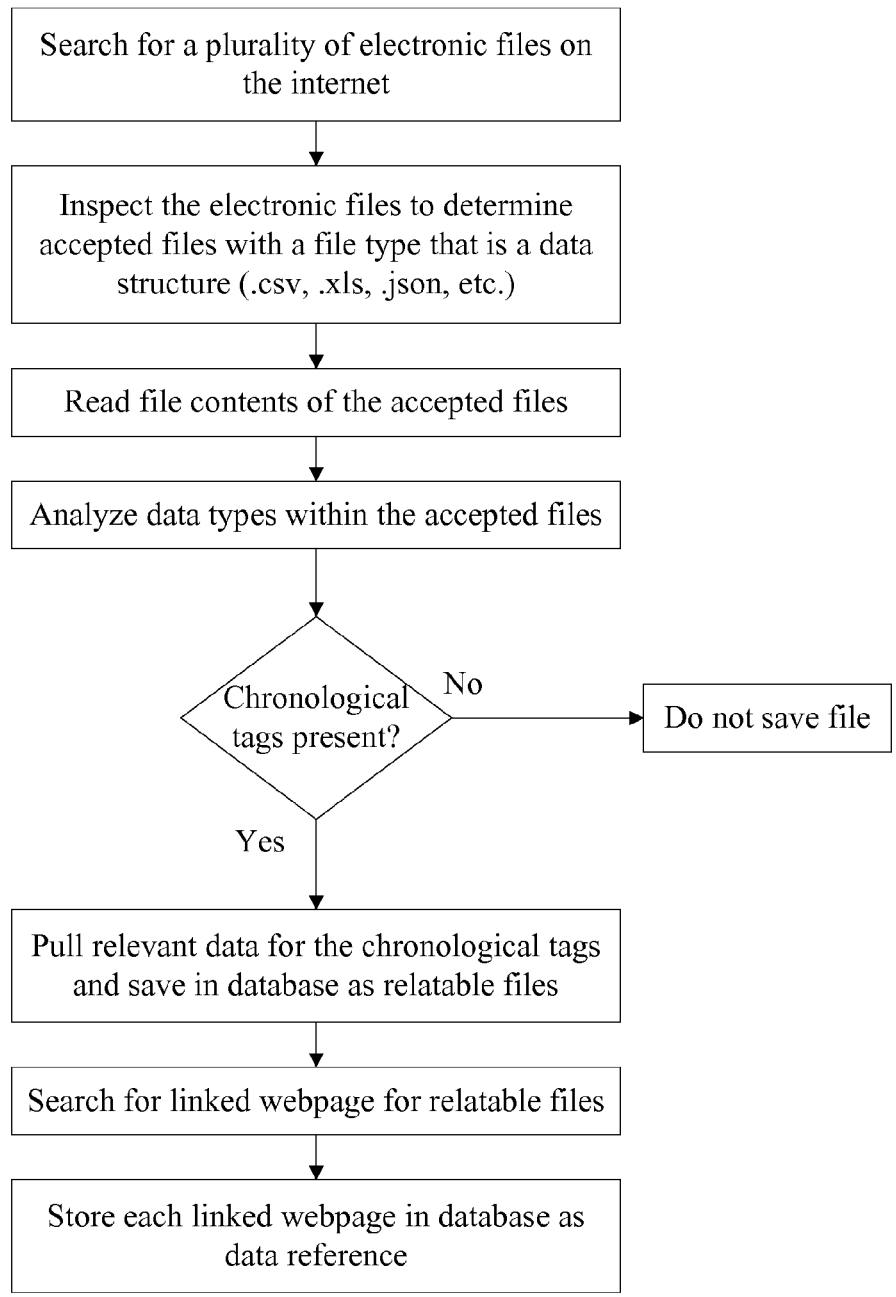
FIG. 7 is a flowchart depicting the process of the web crawler element.
Figure 8:
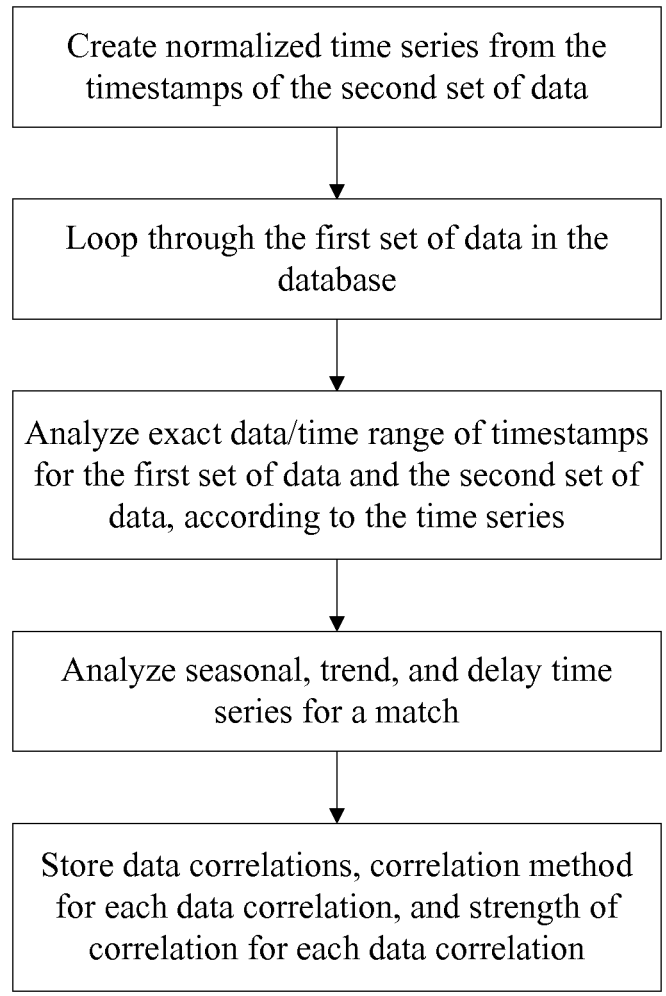
FIG. 8 is a flowchart depicting the process of the analyzer element.

The present invention provides a method for correlating data stored in a database 40. The method is carried out through a web crawler element 10 and an analyzer element 20; both being software operated on a computing device such as a server. In reference to FIG. 7, the web crawler element 10 allows data to be retrieved from the internet from various sources in order to provide a vast database 40 of potential information. In reference to FIG. 8, the analyzer element 20 can then be used to examine information gathered by the web crawler element 10 and information submitted from a user in order to indicate any plausible correlations in the given information. In this manner, the present invention is able to act as a data correlation engine.

Figure 1:
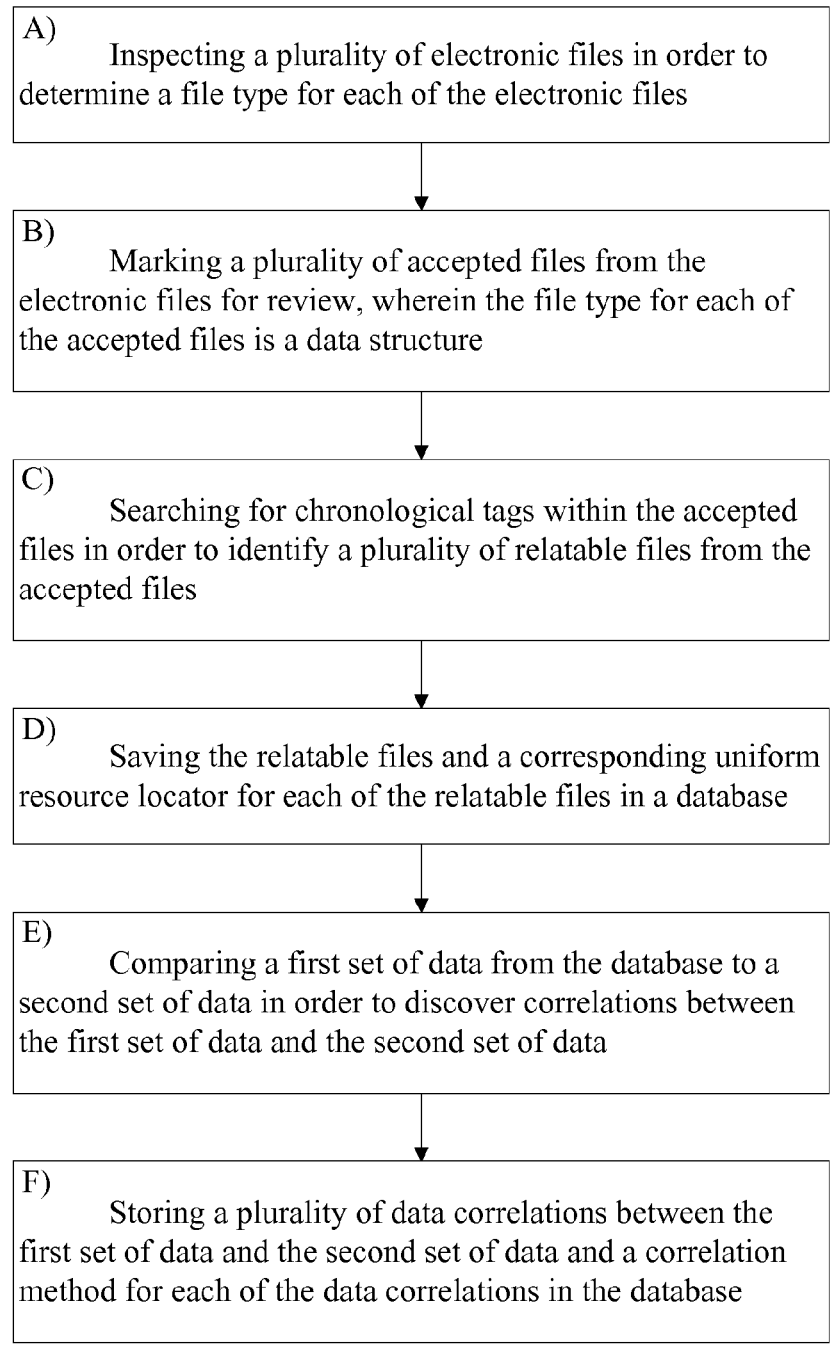
FIG. 1 is a flowchart depicting the overall process of the present invention.

In reference to FIG. 1, through the web crawler element 10, a data gathering process within the method for correlating data is carried out. The computing device searches for and inspects a plurality of electronic files 30 on the internet in order to determine a file type for each of the electronic files 30. More specifically, the computing device inspects the plurality of electronic files 30 for those of which the file type is a data structure. The electronic files 30 can be inspected through a filename extension, internal metadata, external metadata, or any other suitable means. The computing device then marks a plurality of accepted files 31 from the plurality of electronic files 30, wherein the file type for each of the accepted files 31 is a data structure. Examples of acceptable data structures for the file type of the accepted files 31 include, but are not limited to, comma-separated values (CSV), Excel Binary File Format (XLS), JavaScript Object Notation (JSON), and Extensible Markup Language (XML).

In further reference to FIG. 1, the computing device then inspects each of the accepted files 31, wherein the computing device searches for chronological tags 60, or timestamps 70, within the accepted files 31 in order to identify a plurality of relatable files 32 from the accepted files 31. The chronological tags 60 within each of the relatable files 32 indicates data stored at a particular time and/or date. Such data can later be extracted along with the chronological tags 60, wherein the chronological tags 60 allow the data to be organized and compared according to the time and/or date. Each of the relatable files 32 is then stored in a database 40 along with a corresponding uniform resource locator (URL) for each of the relatable files 32; the corresponding URL for each of the relatable files 32 providing the location from which specific files were retrieved.

Figure 2:
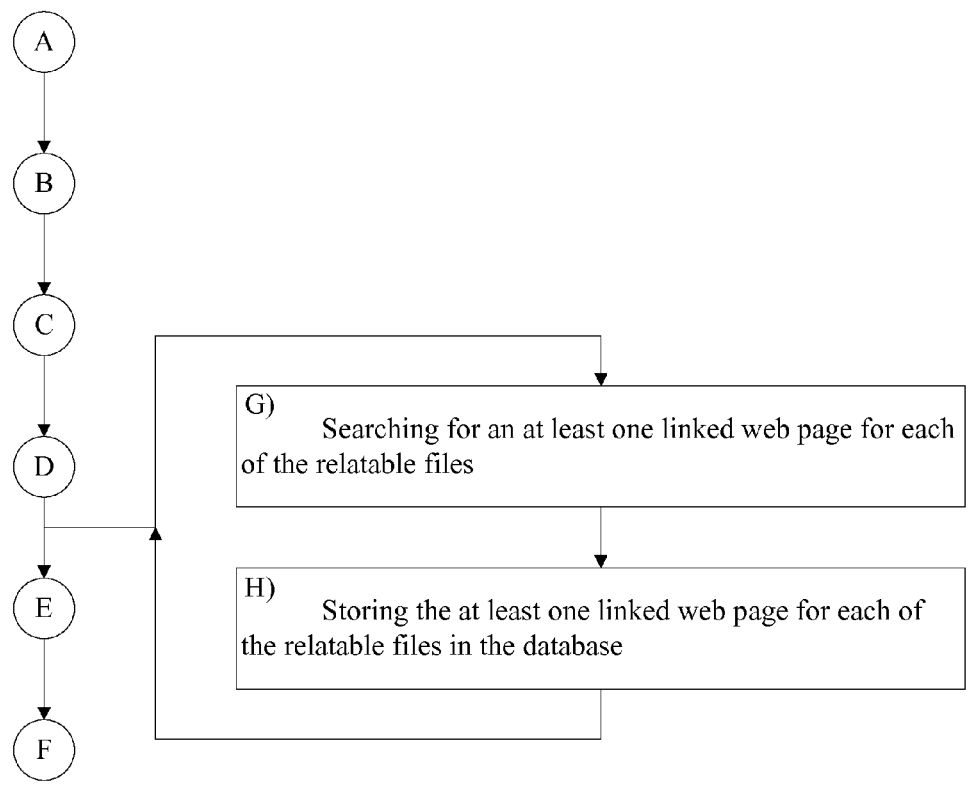
FIG. 2 is a flowchart thereof, further depicting the steps of searching for and storing at least one linked webpage as a data reference in the database.

In reference to FIG. 2, once each of the relatable files 32 is downloaded and stored in the database 40, the computing device searches for an at least one linked web page 50 for each of the relatable files 32. Each of the at least one linked web page 50 is a web page that links to a specific file from the relatable files 32. The at least one linked web page 50 for each of the relatable files 32 is used to determine the subject matter of each of the relatable files 32 and to provide context for each of the relatable files 32. In essence, each of the relatable files 32 is downloaded regardless of the subject of the content, so long as each of the relatable files 32 contains the chronological tags 60. The exact context and subject matter of the relatable files 32 are then determined by examining the at least one linked web page 50 for each of the relatable files 32.

Figure 3:
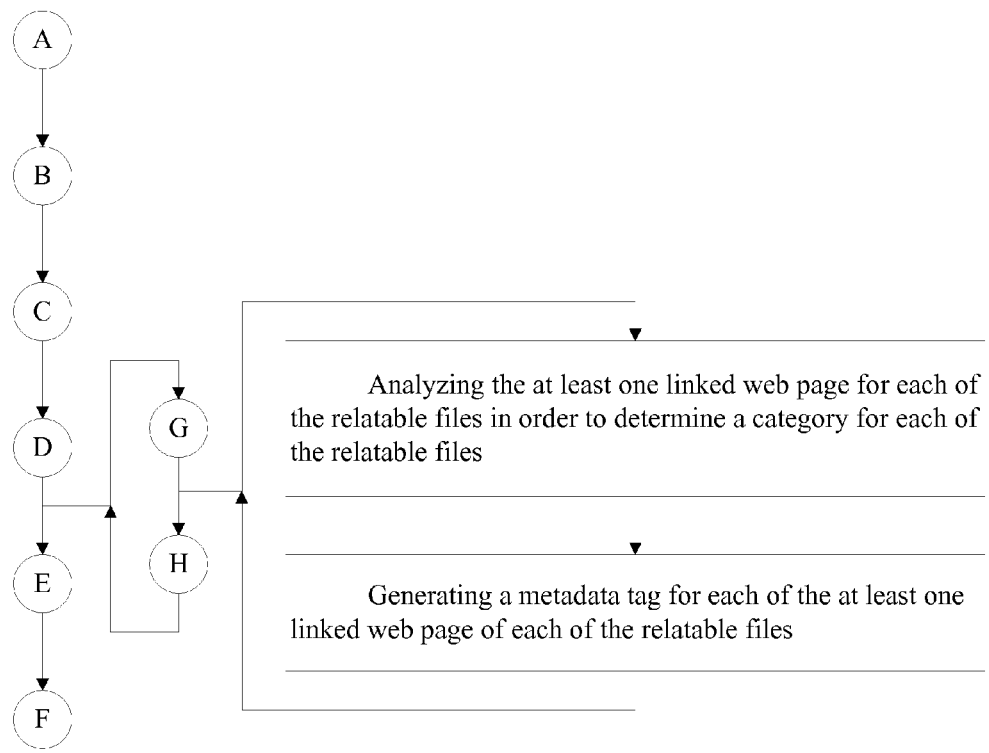
FIG. 3 is a flowchart thereof, further detailing the process for handling the at least one linked web page.

Each of the at least one linked web page 50 for each of the relatable files 32 is then stored in the database 40 along with the relatable files 32 as a data reference. In reference to FIG. 3, the computing device may also analyze the at least one linked web page 50 for each of the relatable files 32 in order to determine a category for each of the relatable files 32, such that the category can be used to define the nature of the specific relatable file, as well as be used to organize and compare the specific relatable file to other files. Additionally, each of the at least one linked web page 50 may be assigned a metadata tag 51, wherein the metadata tag 51 for each of the at least one linked web page 50 relates to the specific relatable file. This allows the at least one linked web page 50 for each of the relatable files 32 to be readily pulled from the database 40 upon request.

Figure 4:
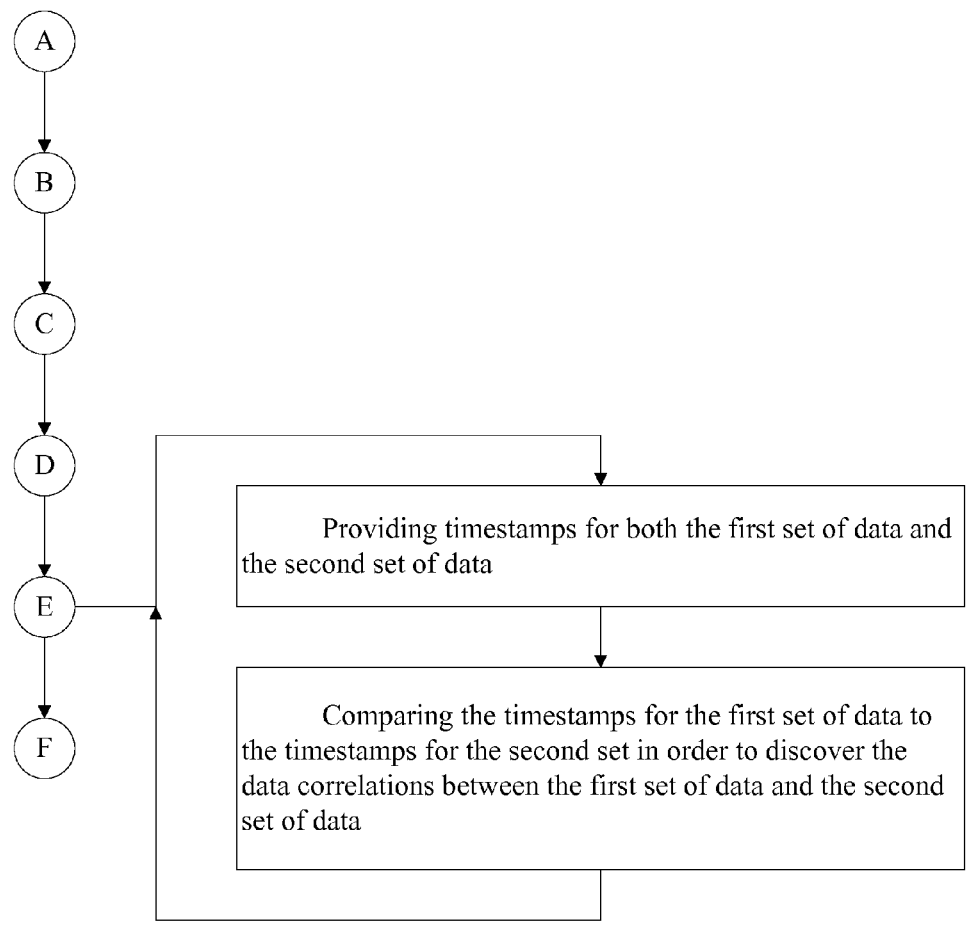
FIG. 4 is a flowchart thereof, further detailing the step for comparing a first set of data to a second set of data to discover data correlations.

Once the computing device has collected the relatable files 32 through the web crawler element 10, the analyzer element 20 can be used to compare two different sets of data to each other. The analyzer element 20 allows the computing device to compare a first set of data 41 from the database 40 to a second set of data 42, wherein both the first set of data 41 and the second set of data 42 include timestamps 70. The timestamps 70 for both the first set of data 41 and the second set of data 42 are associated with pieces of information within the first set of data 41 and the second set of data 42. In reference to FIG. 4, the computing device compares the timestamps 70 for the first set of data 41 to the timestamps 70 for the second set of data 42 in order to discover correlations between the first set of data 41 and the second set of data 42. The computing device then stores a plurality of data correlations 80 between the first set of data 41 and the second set of data 42 in the database 40, along with a correlation method 81 for each of the data correlations 80.

The data correlations 80 can be revealed using one of two processes. In the first and more traditional process, the correlation method 81 is a statistical method, examples of which include, but are not limited to, autocorrelation, trending, seasonality, seasonality decomposition, distributed lags, and Fourier analysis. The present invention is not limited to using just one of these methods, and in fact utilizes multiple methods to ensure that any existing correlations are found. Each of the data correlations 80 found by using one of the traditional, statistical methods is recorded in the database 40, along with the correlation method 81 used to determine the data correlation and the strength of that data correlation. By applying multiple traditional, statistical methods and identifying each of the data correlations 80 with supporting methods of analysis, a person can quickly determine if a data correlation is valid or a fluke. For example, if a given data correlation is only uncovered using one correlation method 81, but not found using other correlation methods, then the given data correlation may be a false positive or very insubstantial. However, if the given data correlation is found by multiple correlation methods, then the given data correlation almost certainly exists, rather than being a result of an analysis error.

Figure 5:
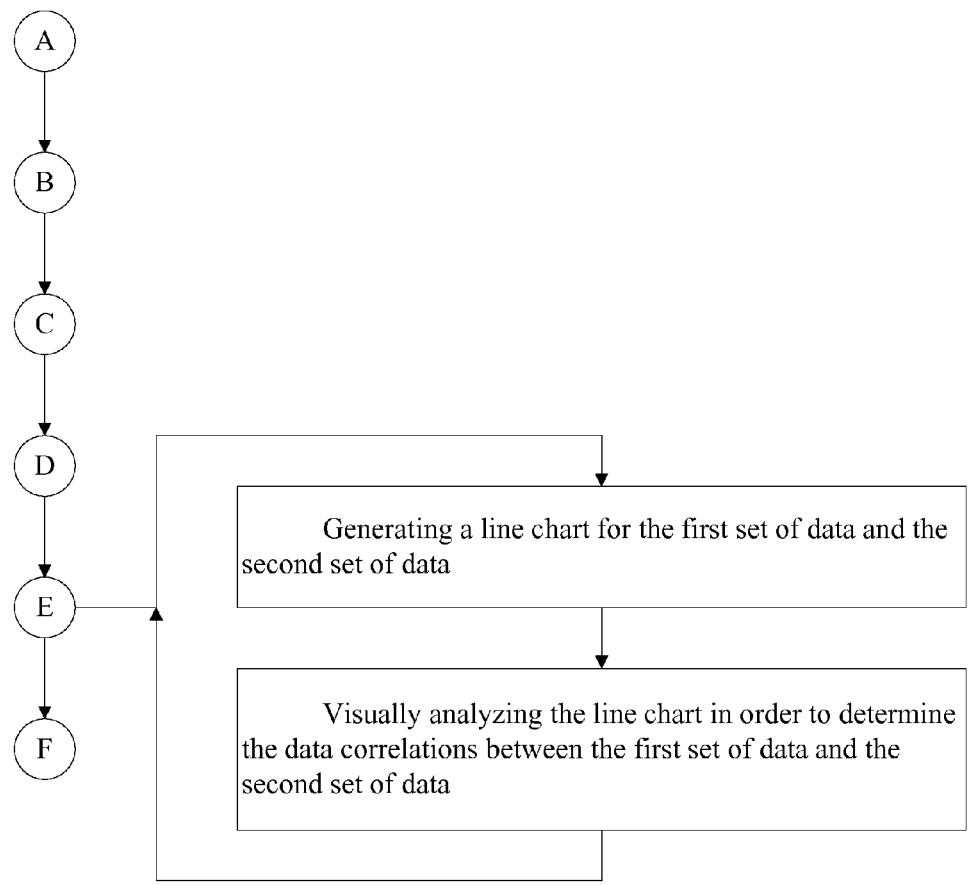
FIG. 5 is a flowchart thereof, further detailing the step for comparing the first set of data to the second set of data by visually analyzing a line chart.

In reference to FIG. 5, the second process for revealing the data correlations 80 is an image analysis method. When implementing the image analysis method, the computing device generates a line chart for the first set of data 41 and the second set of data 42 using the timestamps 70 for the first set of data 41 and the second set of data 42 respectively. This creates a time series line chart for both the first set of data 41 and the second set of data 42, which are overlaid in the same image. The computing device then visually analyses the line chart for the first set of data 41 and the second set of data 42, and determines the data correlations 80 between the first set of data 41 and the second set of data 42. If the shape of the line chart for the first data set and the second data set are very similar, then the analysis determines that a correlation exists. Whereas, if the shape of the line chart for the first set of data 41 and the second set of data 42 are dissimilar, then it is likely that a correlation does not exist. The two processes for revealing the data correlations 80 can either be used individually or in tandem.

Expanding the functionality of the present invention, the processes for revealing the data correlations 80 can also be used to determine time delayed correlations. That is, in addition to matching the timestamps 70 for the second set of data 42 to the timestamps 70 for the first set of data 41, the present invention can look for correlations across data files with different time series or timestamps 70. In other words, the present invention compares data, wherein each of the timestamps 70 for the second set of data 42 is offset from the timestamps 70 of the first set of data 41. Referred to as time "subsets", this allows for the data correlations 80 to be seen even if the timestamps 70 of the first set of data 41 and the second set of data 42 do not match. As an example, given a first data file that tracks ice cream sales, and a second data file that tracks health club memberships, time subsets could be compared from each of the two data files to find that ice cream sales in the summer correlate with health club membership in the fall. Regardless of the correlation method 81 used, the present invention searches for the data correlations 80 by taking a data file (e.g. weather trends), "collecting" unstructured data around it, gathering the unstructured data to determine what it refers to, and finally looking for many different combinations and correlations to identify patterns.

The second set of data 42 that is to be compared to the first set of data 41 from the database 40 can originate from multiple sources. In one instance, the second set of data 42 is from the database 40 as well, wherein a user can compare data for two different subjects defined in the database 40. In addition to crawling the internet for data files, the present invention provides a user interface which allows individuals to upload data files through a user account. Referred to as "private data", these data files can be compared to existing files from the data base of the present invention. If any correlations or matches are found between the existing data and the uploaded data, the present invention notifies the uploading individual of the relevant existing data.

Figure 6:
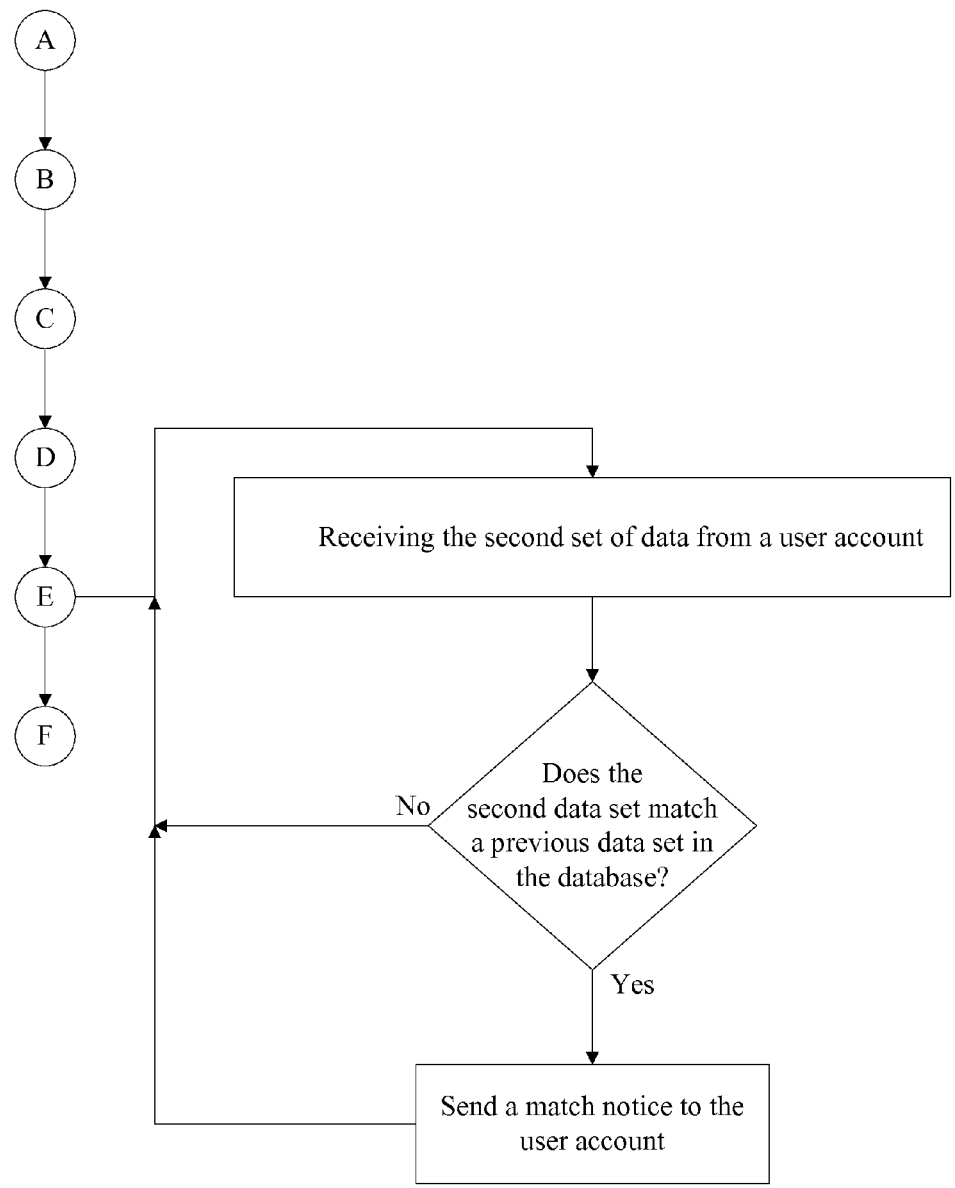
FIG. 6 is a flowchart thereof, further detailing the process for receiving the second set of data from a user account.

The second set of data 42 can be uploaded directly to the database 40 from the user account, or linked to through an existing separate database 40 through the user account. In reference to FIG. 6, the computing device receives the second set of data 42 from the user account and then compares the second set of data 42 submitted by the user to the first set of data 41 from the database 40, wherein the comparison is used to determine if there are data correlations 80 between the second set of data 42 submitted by the user and the first set of data 41 stored in the database 40. In addition, if a matching data file for the second set of data 42 is found, the user, or entity, that submitted the second set of data 42 will be privately notified. The user, or entity, can then proceed to negotiate if and how the other parties (that obtained the same data) will be notified of the matching data. This aspect of the present invention allows entities to compare their data to the data files and observed correlations from the database 40 of the present invention.

To allow for interaction between the present invention and an entity, a user interface is provided. The user interface, acting as a front end, allows an entity to make use of the database 40 and analysis capabilities, which can also be referred to as the back end, of the present invention. Preferably, the front end is implemented as part of a website, wherein users access functions through a user account. The website and front end allow entities to input terms, data files, or databases through the user account. For example, an entity can use the interface to search for "tsunami", trying to find data files relevant to tsunamis. As part of the results returned by the present invention, the user might see a list of earthquake data because there is a strong correlation between earthquakes and tsunamis. These correlations are stored in a hash table, lookup table, list format, or any other suitable manner in the database 40, and can be accessed and viewed directly by an entity. The list shows events or measurements which are correlated, and can sort them according to the strength of correlation.

It is noted that the correlation does not imply causation. The present invention is useful as a tool if merely looking for correlations or if trying to get a starting point in finding a causal relationship. Thus, the present invention can be used as a starting point when trying to determine cause and effect by means of showing correlating data.

Although the invention has been explained in relation to its preferred embodiment, it is to be understood that many other possible modifications and variations can be made without departing from the spirit and scope of the invention as hereinafter claimed.

What is claimed is:

1. A method for correlating data by executing computer-executable instructions stored on a non-transitory computer-readable storage medium, the method comprises the steps of:
   inspecting a plurality of electronic files in order to determine a file type for each of the electronic files;
   marking a plurality of accepted files from the plurality of electronic files for review, wherein the file type for each of the accepted files is a data structure;
   searching for chronological tags within the accepted files in order to identify a plurality of relatable files from the accepted files;
   saving the relatable files and a corresponding uniform resource locator for each of the relatable files in a database;
   comparing a first set of data from the database to a second set of data in order to discover a plurality of data correlations between the first set of data and the second set of data;
   storing the data correlations between the first data set and the second data set and a correlation method for each of the data correlations in the database;
   the correlation method comprising an image analysis method; and
   the image analysis method being implemented by:
      generating a first line chart for the first set of data;
      generating a second line chart for the second set of data;
      overlaying the first line chart and the second line chart on an image;
      visually analyzing the first line chart and the second line chart in order to determine the data correlations between the first set of data and the second set of data;
      determining an existence of correlation in response to a first shape of the first line chart being similar to a second shape of the second line chart; and
      determining a non-existence of correlation in response to the first shape of the first line chart being dissimilar to the second shape of the second line chart.

2. The method for correlating data by executing computer-executable instructions stored on a non-transitory computer-readable storage medium, the method as claimed in claim 1 further comprises the steps of:
   searching for an at least one linked web page for each of the relatable files; and
   storing the at least one linked web page for each of the relatable files in the database.

3. The method for correlating data by executing computer-executable instructions stored on a non-transitory computer-readable storage medium, the method as claimed in claim 2 further comprises the steps of:
   generating a metadata tag for each of the at least one linked web page of each of the relatable files.

4. The method for correlating data by executing computer-executable instructions stored on a non-transitory computer-readable storage medium, the method as claimed in claim 2 further comprises the steps of:
   analyzing the at least one linked web page for each of the relatable files in order to determine a category for each of the relatable files.

5. The method for correlating data by executing computer-executable instructions stored on a non-transitory computer-readable storage medium, the method as claimed in claim 1, wherein the correlation method comprises a statistical method.

6. The method for correlating data by executing computer-executable instructions stored on a non-transitory computer-readable storage medium, the method as claimed in claim 1 further comprises the steps of:
   providing timestamps for both the first set of data and the second set of data; and
   comparing the timestamps for the first set of data to the timestamps for the second set of data in order to discover the data correlations between the first set of data and the second set of data.

7. The method for correlating data by executing computer-executable instructions stored on a non-transitory computer-readable storage medium, the method as claimed in claim 6, wherein each of the timestamps for the second set of data is matched with the timestamps for the first set of data.

8. The method for correlating data by executing computer-executable instructions stored on a non-transitory computer-readable storage medium, the method as claimed in claim 6, wherein each of the timestamps for the second set of data is offset from the timestamps for the first set of data.

9. The method for correlating data by executing computer-executable instructions stored on a non-transitory computer-readable storage medium, the method as claimed in claim 1, wherein the second set of data is from the database.

10. The method for correlating data by executing computer-executable instructions stored on a non-transitory computer-readable storage medium, the method as claimed in claim 1, further comprises the steps of:
   receiving the second set of data from a user account.

11. The method for correlating data by executing computer-executable instructions stored on a non-transitory computer-readable storage medium, the method as claimed in claim 10 further comprises the steps of:
sending a match notice to the user account,
if the second data set matches a previous data set in the database.

12. A method for correlating data by executing computer-executable instructions stored on a non-transitory computer-readable storage medium, the method comprises the steps of:
inspecting a plurality of electronic files in order to determine a file type for each of the electronic files;
marking a plurality of accepted files from the plurality of electronic files for review, wherein the file type for each of the accepted files is a data structure;
searching for chronological tags within the accepted files in order to identify a plurality of relatable files from the accepted files;
saving the relatable files and a corresponding uniform resource locator for each of the relatable files in a database;
searching for an at least one linked web page for each of the relatable files;
generating a metadata tag for each of the at least one linked web page of each of the relatable files;
storing the at least one linked web page for each of the relatable files in the database;
comparing timestamps for a first set of data to timestamps for a second set of data in order to discover the data correlations between the first set of data and the second set of data;
storing the data correlations between the first data set and the second data set and a correlation method for each of the data correlations in the database;
the correlation method comprising an image analysis method; and
the image analysis method being implemented by:
generating a first line chart for the first set of data;
generating a second line chart for the second set of data;
overlaying the first line chart and the second line chart on an image;
visually analyzing the first line chart and the second line chart in order to determine the data correlations between the first set of data and the second set of data;
determining an existence of correlation in response to a first shape of the first line chart being similar to a second shape of the second line chart; and
determining a non-existence of correlation in response to the first shape of the first line chart being dissimilar to the second shape of the second line chart.

13. The method for correlating data by executing computer-executable instructions stored on a non-transitory computer-readable storage medium, the method as claimed in claim 12 further comprises the steps of:
analyzing the at least one linked web page for each of the relatable files in order to determine a category for each of the relatable files.

14. The method for correlating data by executing computer-executable instructions stored on a non-transitory computer-readable storage medium, the method as claimed in claim 12, wherein the correlation method comprises a statistical method or other computer algorithm.

15. The method for correlating data by executing computer-executable instructions stored on a non-transitory computer-readable storage medium, the method as claimed in claim 12, wherein each of the timestamps for the second set of data is matched with the timestamps for the first set of data.

16. The method for correlating data by executing computer-executable instructions stored on a non-transitory computer-readable storage medium, the method as claimed in claim 12, wherein each of the timestamps for the second set of data is offset from the timestamps for the first set of data.

17. The method for correlating data by executing computer-executable instructions stored on a non-transitory computer-readable storage medium, the method as claimed in claim 12, wherein the second set of data is from the database.

18. The method for correlating data by executing computer-executable instructions stored on a non-transitory computer-readable storage medium, the method as claimed in claim 12, further comprises the steps of:
receiving the second set of data from a user account; and
sending a match notice to the user account,
if the second data set matches a previous data set in the database.

* * * * *